United States Patent
Sivasubramanian et al.

(10) Patent No.: US 10,071,825 B2
(45) Date of Patent: Sep. 11, 2018

(54) HYBRID MAGNETO-ACTIVE PROPELLANT MANAGEMENT DEVICE FOR ACTIVE SLOSH DAMPING WITHIN A VEHICLE FUEL TANK

(71) Applicant: Embry-Riddle Aeronautical University, Inc., Daytona Beach, FL (US)

(72) Inventors: Balaji Sivasubramanian, Daytona Beach, FL (US); Leander Paul, Daytona Beach, FL (US); Sathya Gangadharan, Ormond Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 295 days.

(21) Appl. No.: 14/990,180

(22) Filed: Jan. 7, 2016

(65) Prior Publication Data

US 2016/0203901 A1    Jul. 14, 2016

Related U.S. Application Data

(60) Provisional application No. 62/101,180, filed on Jan. 8, 2015.

(51) Int. Cl.
*H01F 7/06* (2006.01)
*B64G 1/40* (2006.01)
(Continued)

(52) U.S. Cl.
CPC .............. *B64G 1/402* (2013.01); *F02K 9/605* (2013.01); *B65D 15/00* (2013.01); *B65D 90/52* (2013.01)

(58) Field of Classification Search
CPC .......... B64G 1/402; B64G 1/40; B64G 1/401; F02K 9/605; H01F 7/06
See application file for complete search history.

(56) References Cited

U.S. PATENT DOCUMENTS 3,110,318 A * 11/1963 Eulitz ................... B64D 37/32
137/1
4,447,743 A   5/1984 Bean et al.
(Continued)

FOREIGN PATENT DOCUMENTS

JP    4201697 A    7/1992
JP    7004963 A    1/1995
(Continued)

OTHER PUBLICATIONS

(NTRS—NASA Technical Reports Server [online]. ntrs.nasa.gov [retrieved on Jan. 13, 2011]. Retrieved from the Internet: <URL: https://ntrs.nasa.gov/search.jsp?R=20110002866  2018-01-06T16:47:47+00:00Z>.*
(Continued)

*Primary Examiner* — Thienvu Tran
*Assistant Examiner* — Nicolas Bellido
(74) *Attorney, Agent, or Firm* — Womble Bond Dickinson (US) LLP (57) ABSTRACT

This disclosure includes a hybrid magneto-active membrane, which can be used as part of a Magneto-active Propellant Management Device (MAPMD), to actively control free surface effects of liquid materials, such as fuels, and to reduce fuel slosh. The disclosed MAPMD merges aspects of a diaphragm membrane with a magneto-active inlay to control the membrane during in-flight conditions.

17 Claims, 7 Drawing Sheets

(51) Int. Cl.
*B65D 90/52* (2006.01)
*F02K 9/60* (2006.01)
*B65D 8/00* (2006.01)

(56) References Cited

U.S. PATENT DOCUMENTS

| | | | |
|---|---|---|---|
| 4,475,290 A | 10/1984 | Colditz | |
| 4,844,974 A * | 7/1989 | McCullough, Jr. | B65D 90/22 428/408 |
| 4,863,055 A | 9/1989 | Bietz | |
| 5,279,323 A * | 1/1994 | Grove | F17C 9/00 137/154 |
| 5,312,678 A * | 5/1994 | McCullough, Jr. | B32B 5/22 442/189 |
| 6,220,287 B1 * | 4/2001 | Wolf | B64G 1/402 137/574 |
| 6,283,412 B1 | 9/2001 | Mango | |
| 6,568,556 B1 | 5/2003 | Kahler, Jr. et al. | |
| 7,604,256 B2 | 10/2009 | Reber | |
| 7,648,749 B1 | 1/2010 | Taylor | |
| 8,382,042 B2 * | 2/2013 | Sanderson | B29C 44/56 244/201 |
| 8,408,497 B2 * | 4/2013 | Boelitz | B64G 1/002 244/158.9 |
| 8,590,565 B2 | 11/2013 | Watanabe et al. | |
| 8,708,190 B2 * | 4/2014 | Chun | B65D 90/52 220/563 |
| 9,004,308 B2 | 4/2015 | Spencer et al. | |
| 9,599,284 B2 * | 3/2017 | Shin | B63B 25/08 |
| 2003/0000299 A1 * | 1/2003 | Nakano | B64G 1/402 73/149 |
| 2007/0096453 A1 | 5/2007 | Reber | |
| 2009/0078705 A1 * | 3/2009 | Ramsay | B60K 15/077 220/562 |
| 2010/0320329 A1 | 12/2010 | Boelitz et al. | |
| 2013/0121766 A1 * | 5/2013 | Birger | A63H 23/10 405/52 |
| 2013/0153179 A1 | 6/2013 | Davies et al. | |
| 2015/0352945 A1 | 12/2015 | Matusek et al. | |

FOREIGN PATENT DOCUMENTS

| | | |
|---|---|---|
| JP | 2011184087 A | 9/2011 |
| WO | WO 2015/105961 A1 | 7/2015 |

OTHER PUBLICATIONS (Embry-Riddle Aerounatical University [online]. commons.erau.edu [retrieved on Apr. 2014]. Retrieved from the Internet: <URL: https://commons.erau.edu/cgi/viewcontent.cgi?article=1180 &context=edt>.*

Gangadharan, Sathya N., "Parameter Estimation of Spacecraft Nutation Growth Model", H-1/H-4, Center, John F. Kennedy Space, 2003.
Chatman, Yadira, Ganngadharan, Sathya, Marsell, Brandon, and Hubert, Carl, "Mechanical Analog Approach to Parameter Estimation of Lateral Spacecraft Fuel Slosh", 2008.
Burke, Caley Ann, "Nutation in the spinning Spheres spacecraft and fluid slosh", PhD diss., Massachusetts Institute of Technology, 2010.
Loads, Propellant Slosh, NASA Space Vehicle Design Criteria Monograph (Structures), *NASA SP-8009*, Aug. 1968.
Vreeburg, Jan P.B., "Spacecraft Maneuvers and Slosh Control", IEEE Control Systems Magazine, Jun. 2005, pp. 12-16.
Suppression, Slosh. "NASA Space Vehicle Design Criteria (Structures)", *NASA SP-8031*, May 1969.
Santhanam, Vijay, Baum, Rudy, Kim Daewon, and Gangadharan, Sathya, "Slosh Damping with Floating Electro-active Micro-baffles", $55^{th}$ AIAA/ASMe/ASCH/AHS/SC Structures, Structural Dynamics, and Materials Conference, Jan. 13-17, 2014, National Harbour, Maryland, AIAA 2014-0693.
Benson, David J., and Mason, Paula, "Method for CFD Simulation of Propellant Slosh in a Spherical Tank", 2011.
Lenahen, Brian, et al., "A Computational Investigation for Determining the Natural Frequencies and Damping Effects of Diaphragm-Implemented Spacecraft Propellant Tanks", $53^{rd}$ AIAA/ASME/ASCE/AHS/ACS Structures, Structural Dynamics and Materials Conference $20^{th}$ AIAA/ASME/AHS Adaptive Structures Conference $14^{th}$ AIAA, 2012.
Schlee, K., Gangadharan, S.N., Ristow, J., Sudermann, J., Walker, C., and Hubert, C., "Modeling and Parameter Estimation of Spacecraft Fuel Slosh", $29^{th}$ Annual AAS Guidance and Control Conference, Paper# AAS-06-027, American Astronautical Society, Rocky Mountain Section, Breckenridge, Colorado, 2006.
Sances, D.J., Gangadharan, S.N., Sudermann, J.E., and Marsell, B., CFD Fuel Slosh Modeling of Fluid-Structure Interaction in Spacecraft Propellant Tanks with Diaphragms and Proceedings, 2010.
Santhanam, V., "Slosh Damping using Floating Magnetoactive Micro-baffles", M.S. Thesis Dissertation, Aerospace Engineering Dept., Embry-Riddle Aeronautical Univ., Daytona Beach, FL, 2014.
Sivasubramanian, Balaji, Rosario, Leander Paul, Krishnappa, Sanjay, and Gangadharan, Sathya, "A Hybrid Magneto-active Propellant Management Device for Active Slosh Damping in Spacecraft", American Institute of Aeronautics and Astronautics, pp. 1-9, Embry-Riddle Aeronautical University, Daytona Beach, FL, 32114; Jan. 2015.
Leuva, Dhawal, Sathyanarayan, Priya, Sathyanarayan, Deepak, and Gangadharan, Sathya, "Experimental Investigation and CFD Simulation of Active Damping Mechanisms for Propellant Slosh in Spacecraft and Launch Vehicles"; Proceedings of $6^{th}$ International Multi-Conference on Engineering and Technological Innovation: IMETI 2013; Orland, FL; Jul. 2013.
Stephens, David G., "Flexible Baffles for Slosh Damping", Journal of Spacecraft and Rockets; 3.5; May 1966; pp. 765-766.

* cited by examiner

FIG. 7

HYBRID MAGNETO-ACTIVE PROPELLANT MANAGEMENT DEVICE FOR ACTIVE SLOSH DAMPING WITHIN A VEHICLE FUEL TANK

CROSS REFERENCE TO RELATED APPLICATIONS

The present Patent Application is a formalization of previously filed, U.S. Provisional Patent Application Ser. No. 62/101,180, filed Jan. 8, 2015 by the inventors named in the present Application. This Patent Application claims the benefit of the filing date of this cited Provisional Patent Applications according to the statutes and rules governing provisional patent applications, particularly 35 U.S.C. § 119(e), and 37 C.F.R. §§ 1.78(a)(3) and 1.78(a)(4). The specification and drawings of the Provisional Patent Application referenced above are specifically incorporated herein by reference as if set forth in their entirety.

TECHNICAL FIELD

Embodiments of this disclosure generally relate to liquid management devices. For example, devices configured for damping slosh of propellants, such as liquid fuels or other liquid materials in a tank.

BACKGROUND

Liquid propellants can be used in spacecraft, aircraft and other projectiles. Although liquid propellants provide highly efficient thrust, the movement of the propellant inside a fuel tank is often unpredictable. During the process of stage separation, one fuel tank may be separated from the payload and the other fuel tanks of a spacecraft. The vibration caused by the stage separation may be transferred into the remaining fuel tank(s), impacting forces and moments on the fuel. These forces can cause the fuel to move around within the tank in an uncontrolled oscillatory fashion, which may lead to a phenomenon known by the term fuel slosh. Fuel slosh can also be caused by other maneuvers, such as when a spacecraft attempts a change in attitude. Generally, fuel moves as a bulk mass inside the tank, where the upper portion of the fluid produces larger displacement than the lower portion.

Sloshing of fuel or other liquid imparts unwanted forces and moments on the tank's walls, and produces oscillatory forces that can cause a spacecraft to wobble (known as nutation). Nutation tends to increase exponentially with time, and is governed by a Nutation Time Constant. If left unattended, nutation can cause undesirable trajectory change. Fuel slosh can also negatively impact the fuel consumption characteristics of the spacecraft.

Anti-sloshing is the process of damping slosh waves from their resonant frequency condition. Some research has been carried out seeking to minimize the energy dissipation of fuel slosh, and seeking to limit the impact of the slosh momentum on fuel tanks. Scientists have developed several systems to counteract the forces and moments produced by fuel slosh, known collectively as propellant management devices (PMD). These devices include active and passive baffle structures, as well as elastomeric membranes. In some instances, passive baffle structures are placed along the inner walls of the tanks, which apart from minimizing the propellant slosh, also act as formers providing structural integrity to the tank design. In other cases, active baffles are structures that are present within or on top of the liquid surface within the tank. The active baffles move along with the liquid and constrain the slosh behavior of the liquid by the application of external stimuli. Example active baffles are described in commonly owned application PCT/US15/10602 entitled "Floating Active Baffles, System and Method of Slosh Damping Comprising the Same", which is incorporated herein by reference. Although baffles (both active and passive) provide considerable damping effect on the slosh, baffles add to the overall structural mass of the tank, making the tank heavier and reducing the volume of the tank available for propellant. Another type of PMD includes the use of elastomeric membranes. Elastomeric membranes are often thin polymer structures that are resistant to the effects of hydrocarbons present in the fuel. Passive elastomeric membranes are used as fixed diaphragms inside the tank to provide slosh suppression. The effectiveness of slosh damping may depend on the elastic coefficient of the elastomeric membrane. Active elastomeric membranes may be activated to vibrate using external stimuli.

There remains a need for additional propellant management devices that combine the strengths of the existing devices.

SUMMARY

This disclosure includes a hybrid magneto-active membrane, which can be used as part of a Magneto-active Propellant Management Device (MAPMD), or generally a fuel tank management device. The hybrid magneto-active membrane is designed to actively control free surface effects of liquid materials such as fuels, and to reduce fuel slosh. The MAPMD of the present disclosure merges aspects of a diaphragm membrane with a flexible magneto-active inlay to control the diaphragm membrane during in-flight conditions.

The effective changes in diaphragm shape, stiffness or configuration according to variations created in a generated magnetic field allow for the damping of free surface effects and slosh of the liquid fuel. The MAPMD is configured to provide damping across various slosh amplitudes, various fuel fill levels, and also at various attitudes of the spacecraft. As such, the magnetic field may be varied, e.g. switched on and off, in response to at least one of a variation in slosh amplitude of the liquid fuel within the fuel tank, fuel fill levels, an attitude of the vehicle, an anticipated maneuver, or combinations thereof. The versatile shape adaptability of the disclosed MAPMD has been found effective when used in microgravity applications.

Embodiments of the present disclosure include a fuel tank management device for damping liquid fuel slosh within a fuel tank of a vehicle. The fuel tank management device comprises a hybrid magneto-active membrane and a magnetic field source. The hybrid magneto-active membrane may include at least one polymer membrane and a magneto-active matrix comprising a layer of magnetically permeable material configured to move with the at least one polymer membrane. The magnetic field source may be for generating a magnetic field of a sufficient strength to effect a change in shape or stiffness or configuration or combinations thereof of the hybrid magneto-active membrane for damping liquid fuel slosh.

Embodiments of the present disclosure also include a magneto-active propellant management device (MAPMD) for a fuel tank comprising a hybrid membrane and a magnet in proximity to the hybrid membrane. The hybrid membrane may include at least one polymer membrane and a magneto-active matrix comprising a layer of magnetically permeable material configured to move with the at least one polymer membrane. The magnet is configured to generate a magnetic field for activating the magneto-active matrix and to vary a configuration of the hybrid membrane so as to substantially dampen fuel slosh within the fuel tank.

Other embodiments of the present disclosure include a method for damping fuel slosh within a fuel tank. The method comprises positioning a hybrid magneto-active membrane within the fuel tank and generating a magnetic field proximate to the fuel tank. The hybrid magneto-active membrane may comprise at least one polymer membrane and a magneto-active matrix. The magneto-active matrix may comprise a flexible layer of magnetically permeable material configured to move with the at least one polymer membrane. The magnetic field is intended to activate the magneto-active matrix to effect a change in shape or stiffness or both of the hybrid magneto-active membrane sufficient to absorb energy from sloshing fuel within the fuel tank to substantially dampen sloshing movement of the fuel.

These and other advantages and aspects of the embodiments of the disclosure will become apparent and more readily appreciated from the following detailed description of the embodiments taken in conjunction with the accompanying drawings, as follows.

DETAILED DESCRIPTION

The following detailed description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Figure 7:
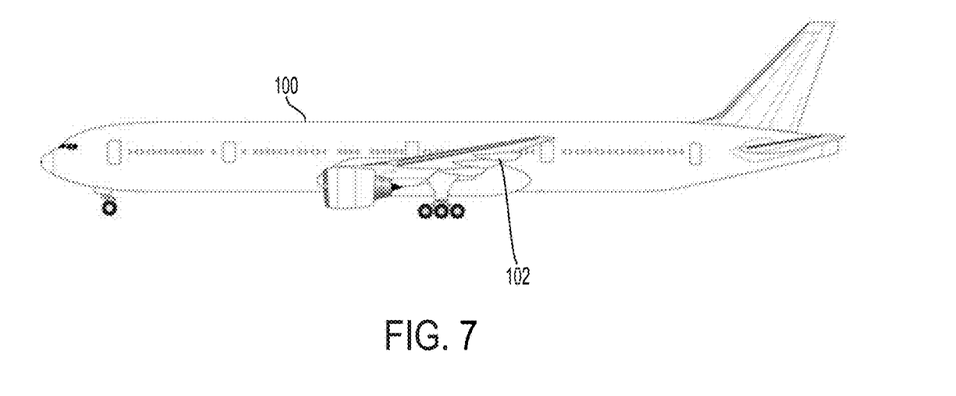
FIG. 7 shows a perspective view of an example vehicle with a fuel tank in which the hybrid magneto-active propellant device can be used according to principles of the present disclosure.

This disclosure includes a hybrid magneto-active membrane, used as part of a Magneto-active Propellant Management Device (MAPMD), to actively control the free surface effect and reduce fuel slosh within a fuel tank. The fuel tank may be found in several types of vehicles, but may be particularly suitable for vehicles traveling through the air, including aircraft, spacecraft or projectiles. FIG. 7 shows an exemplary aircraft 100 with a fuel tank 102 according to principles of the present disclosure. The MAPMD may be more generally referred to as a fuel tank management device. The MAPMD merges aspects of a diaphragm membrane with a magneto-active inlay to control the membrane during in-flight conditions.

Figure 1:
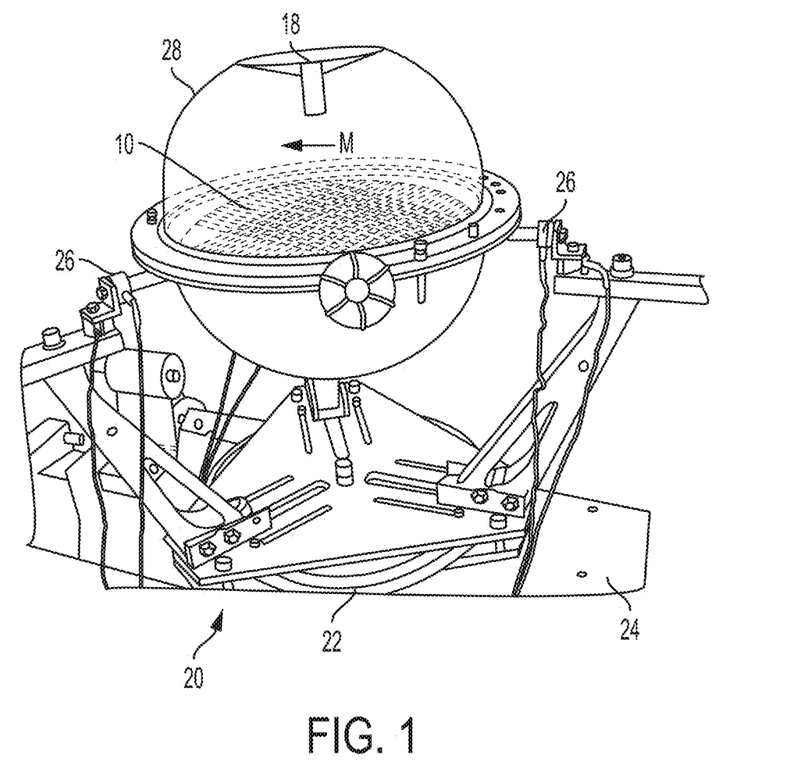
FIG. 1 shows an experimental fuel slosh test setup.
Figure 2A:
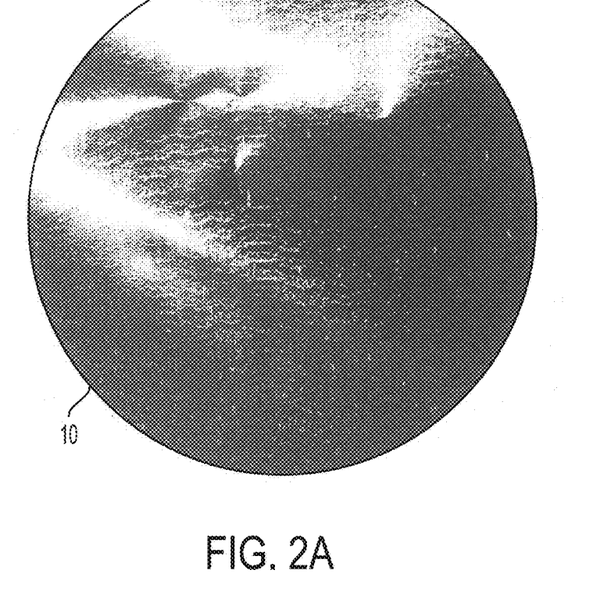
FIG. 2A shows hybrid membrane with a magneto-active sheet according to one embodiment.
Figure 2B:
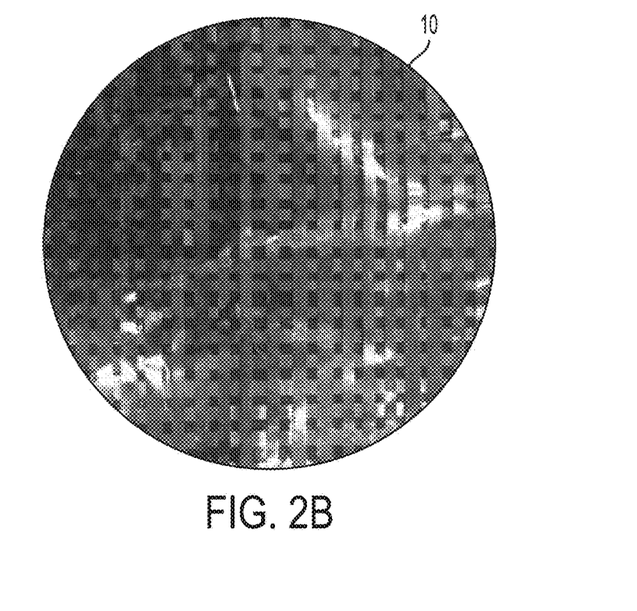
FIG. 2B shows a hybrid membrane with a magneto-active mesh according to another embodiment.
Figure 2C:
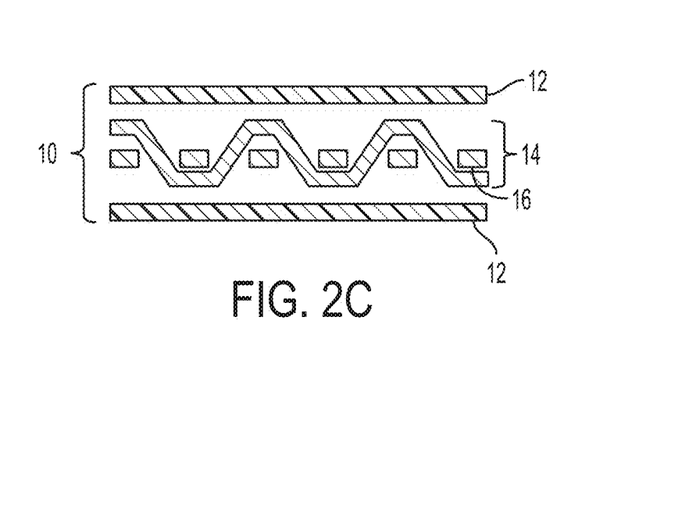
FIG. 2C shows a schematic exploded cross section of the hybrid membrane of FIG. 2B.

As seen in FIGS. 1 and 2, a hybrid membrane 10 may be formed from the combination of one or more layers of a polymer membrane 12, similar to those used in diaphragm type propellant management devices, combined with, embedded with, or impregnated into a magneto-active matrix 14 formed of a material that has high magnetic permeability. The matrix 14 is therefore capable of being stimulated, e.g. activated, by a magnetic field. The magneto-active matrix 14 may be in a sheet form as shown in FIG. 2A or may be formed by a plurality of woven strips 16 to form a grid or mesh as shown in FIGS. 2B and 2C. The mesh embodiment may be preferred because the structure allows for increased flexibility and surface area of the matrix 14. Such enhanced or increased flexibility imparts an ability to absorb energy from the sloshing action of the fuel. In a further embodiment, the magneto-active matrix may be laid out on the polymer membrane 12 in series of small concentric dots or similar surface features spaced across and substantially covering the surface area of the polymer membrane. In this way, substantially the entire polymer surface may be patterned with the magneto-active material, but each dot or other surface feature of magneto-active material generally will not be directly interlinked with the adjacent ones, so that each dot can act individually on the polymer membrane. An embodiment having dots also may be less stiff, and capable of greater control by the magnetic field, than the sheet or mesh embodiments.

FIG. 2C shows the polymer membrane 12, which may be substantially transparent, disposed adjacent to the matrix 14. The polymer membrane 12 could provide a barrier to prevent the liquid fuel from sloshing into the gaps in the mesh.

A Magneto-Active Propellant Management Device combines the hybrid membrane 10 with a magnetic field source, such as an electromagnet 18 or a permanent magnet. An electromagnet 18 may be preferred if the hybrid membrane 10 is to be selectively activated. For example, the magnetic field source may include an electromagnet 18 and a power supply for providing varying power levels (e.g. on and off, and/or hi, low, medium, etc. power) to vary the strength of the magnetic field. The strength of the magnetic field may be varied in response to at least one of: a variation in slosh amplitude of the liquid fuel within the fuel tank, fuel fill levels, an attitude of the vehicle, an anticipated maneuver, or combinations thereof. In one embodiment, the anticipated maneuver is stage separation, and the magnetic field is generated by applying current to an electromagnet ahead of stage separation. The effective change in shape, stiffness, configuration or combinations thereof of the hybrid membrane 10 according to such variations in the magnetic field allows for the damping of free surface effect and slosh at various slosh amplitudes, fuel fill levels, and also at various attitudes of the spacecraft, when the hybrid membrane 10 is provided in the fuel tank. The versatile shape adaptability of this system makes it very effective when used in microgravity applications.

One skilled in the art will also recognize that use of the MAPMD may be described in terms of a method of damping, particularly the damping of liquid slosh, and more particularly the damping of fuel slosh in a spacecraft.

Tests and Results

An exemplary test set up is shown in FIG. 1. A slosh test bed 20 was used to experimentally show the benefits of the described MAPMD. The test bed 20 includes a force balance 22 with actuators 24 and an Aerotech's soloist CP software that is coupled with the test bed. LabVIEW was used for system actuation, while a few load cells 26 were utilized for the slosh energy calculation on the walls of the test tank 28. Tests were conducted in this slosh test bed 20 using a spherical tank 28 having an 8" diameter attached at three locations to the actuators 24. The magnetic field is generated by using one or both of electromagnets 18 and permanent magnets.

In the tested embodiment, the magneto-active matrix 14 (FIG. 2C) was built out of an iron-based magnetic alloy called Metglas® 2605SA1 available from Metglas, Inc. of Conway, S.C. The Metglas® 2605SA1 (hereafter "Metglas") is provided as a thin metal alloy ribbon. Metglas used in this experiment is an iron-based material having extremely low core losses. The advantage of this material is its high permeability and core loss, up to 40% of the core loss compared to that of M3 electric steel. Because of this advantage, Metglas is used in power transformers, motors and devices requiring high permeability and low core loss at low frequencies. The maximum permeability of Metglas is given as 600,000.

When selecting a material, metal oxidization should be minimal as a result of the material contacting the fuel or being subject to a magnetic field. Suitable materials should also be tough, as deduced by the mechanical properties of the material, including the modulus of elasticity and the tensile strength thereof. Other materials that may be suitable for the magneto-active matrix 14 may include annealed stainless steel, for example, martensitic stainless steel of the 400 series, which is composed of 11.5%-18% chromium with higher levels of carbon. The stainless steel undergoes high treatment for hardness and strength levels. A typical 420 stainless steel is magnetic in both annealed and hardened conditions. The relative permeability of this material varies from 750-950. Stainless steel is also highly corrosion resistant and readily available.

Mu-Metal, another magnetic alloy with a composition of 77% nickel, 16% iron, 5% copper and 2% chromium or molybdenum, may be used. The magnetic permeability of Mu-Metal becomes 40 times greater when annealed with hydrogen. An advantage of Mu-Metal may be its ductility, allowing it to be drawn into sheets. When used in AC magnetic circuits, hysteresis losses are very low. The magnetic permeability of Mu-Metal is 80,000-200,000.

Supermalloy, available from Magnetics® of Pittsburgh, Pa., may also be a suitable material. Supermalloy is a specially processed 80% nickel-iron alloy. Often used for pulse transformers and ultra-sensitive magnetic amplifiers, supermalloy has permeability in the range of 40,000-100,000. Further, supermalloy exhibits low core loss.

Another high magnetic permeability material is amumetal as used by Amuneal Manufacturing Corp. of Philadelphia, Pa. Additionally, Hipernom® available from Carpenter Technology Corporation of Reading, Pa., could be suitable for the magneto-active matrix 14. Hipernom® is an 80% nickel alloy along with about 15% iron and about 4.20% molybdenum. This soft magnetic alloy exhibits high permeability with minimum hysteresis loss. Hipernom® is also known as EFI alloy 79. This alloy is used in high quality motor laminations and stepping motors. The permeability of hipernom is given as 230,000.

The tested matrix 14 was used as an embedded layer within a polymer diaphragm type PMD. The matrix size and shape were cut to the tank size and were tested for correct fit. The tested mesh was created initially by interweaving the Metglas ribbons to form the matrix 14 to increase surface area as well as to improve flexibility of the MAPMD. Two embodiments of the hybrid membrane 10, one with the matrix 14 as a plain sheet (see FIG. 2A) and another with the mesh matrix 14 (see FIG. 2B) were tested.

Figure 3:
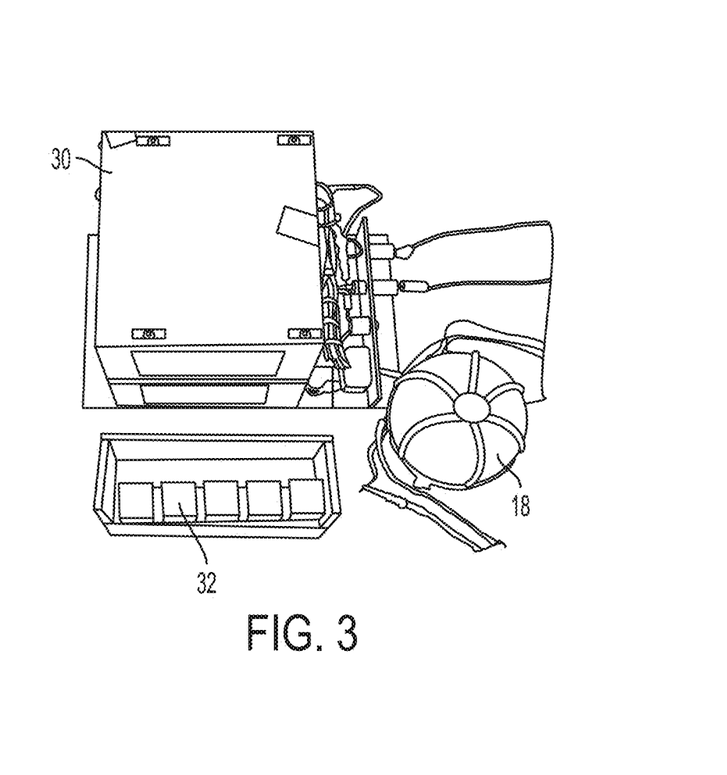
FIG. 3 shows an example electromagnet for activation of the disclosed hybrid membranes.

The polymer membrane 12 may be manufactured out of industrial pneumatic sealing high performance polymers that are designed for the use in high temperatures and with corrosion resistance, which can be used in a rotary environment. These polymer membranes 12 embedded with the Metglas matrix 14 inlay are configured to provide a block force to absorb the energy transfer present in sloshing fuel when a magnetic field is applied to the hybrid membrane 10 during fuel slosh. The hybrid membrane 10 is placed in the tank 28 with the hybrid membrane positioned along the top surface of the test liquid. This position of the hybrid membrane 10 along the top surface of the test liquid may be the result of the hybrid membrane 10 floating on top of the test liquid. The hybrid membrane 10 may not be fixed to the walls of the tank 28. The liquid was filled to 60% of the tank volume. It is believed that maximum slosh intensity may be generated when a tank is 60% full of liquid. For the preliminary test of the MAPMDs, modified electromagnetic solenoids 18 with a power supply 30 were used, as shown in FIG. 3. A number of tests were also performed in the presence of strong, e.g. neodymium, permanent bar magnets 32 as also shown in FIG. 3.

The tests were conducted in accordance with the set up shown in FIG. 1. Particularly, the electromagnet 18 was suspended above the hybrid membrane 10. The electromagnet 18 was oriented such that the magnetic field (see arrow M) was acting substantially parallel with the plane of the hybrid membrane 10. When the hybrid membrane 10 was activated in the presence of a parallel magnetic field, the hybrid membrane 10 substantially stiffened into a more planar configuration. The hybrid membrane 10 thus became more rigid, acting similar to a thin walled baffle.

The experiment was conducted in three phases. The first phase, known as the free slosh characterization phase, included taking and analyzing the baseline sloshing values. In the second phase, the slosh test was conducted with the hybrid membrane 10 without the presence of a magnetic field, and the slosh characterization was performed. In the third phase, the magnetic field was applied, and the hybrid membrane 10 was controlled to achieve a higher damping ratio and the slosh characterization was once again performed.

These three phase experiments are performed under two conditions, namely low amplitude and high amplitude slosh conditions. The parameters used in the test are given below in Table 1.

TABLE 1

Test case parameters.

| Test Case | Lateral Amplitude, A (mm) | Frequency, $f_a$ (Hz) | Cycles, $N_c$ |
|---|---|---|---|
| Low slosh condition | 2.5 | 2.0 | 10 |
| High slosh condition | 3.0 | 2.0 | 10 |

During testing, the slosh was allowed to form laterally by excitation under simple harmonic motion until a natural frequency was reached, after about 6 seconds of excitation, and the phase one test was conducted. The forced motion on the tank 28 provided by the actuators 24 was then stopped, and the liquid was allowed to achieve natural damping until complete damping was witnessed.

Figure 4:
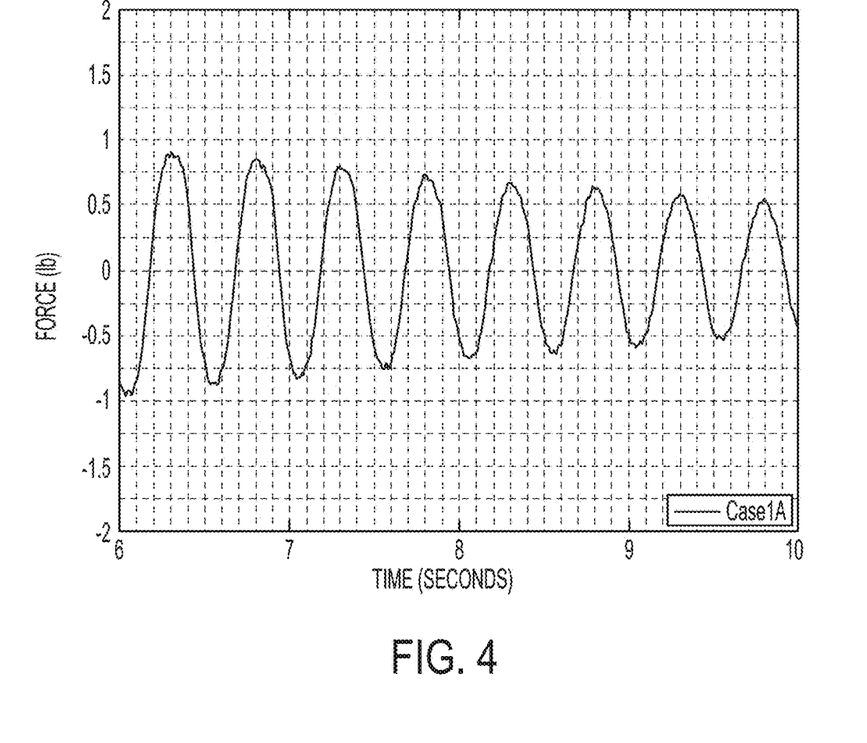
FIG. 4 is a graph showing low amplitude free slosh.
Figure 5A:
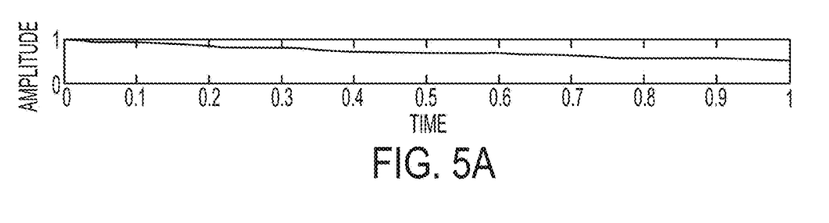
FIGS. 5a-e are normalized graphs of slosh for various test conditions at low amplitude.
Figure 5B:
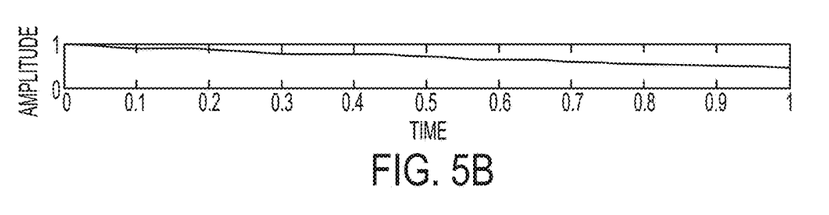
Figure 5C:
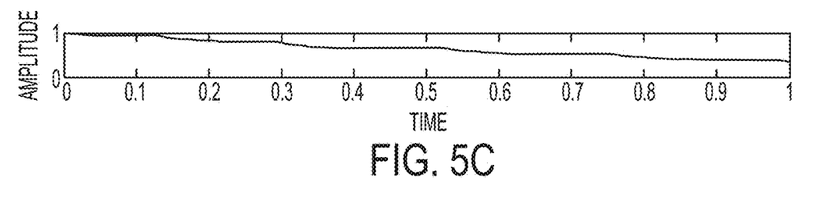
Figure 5D:
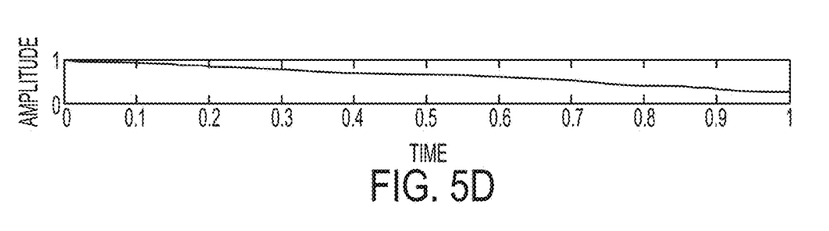
Figure 5E:
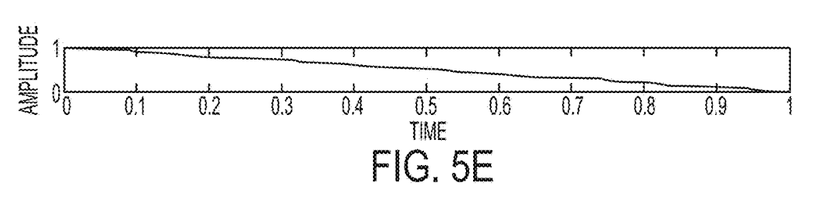

The signals from a FUTEK load cell 26 were used for the slosh characterization. The characterization was done by taking into account the signals after the actuator 22 had stopped, which gives the remnant slosh. The free slosh condition without any PMD is shown in FIG. 4. The free slosh condition shows high amplitude remnant slosh which can be detrimental to any aircraft or spacecraft.

After the free slosh experiments, various cases were tested. The test was conducted with and without activating the hybrid membranes 10. When activated, a magnetic field was applied substantially uniformly in both direction and magnitude to the hybrid membrane. In other words, the magnetic field source was generally stationary to maintain the direction of the magnetic field, and the electromagnet 18, and when engaged, provided a substantially constant field strength. When activated, the hybrid membranes 10 were subject to the magnetic field for approximately 4-6 seconds. The same test case is repeated for both the sheet and mesh embodiments of the matrix 14, and the results, taken over a measurement period of ten seconds, are obtained through the data acquisition system of the test bed 20 working with a 0.01 second time step.

FIG. 5 shows the normalized slosh amplitude characterization for various conditions after being excited under the low amplitude test case. FIG. 5a shows the case were no PMD is present in the tank 28. FIG. 5b shows the results of the inactive hybrid membrane with the sheet matrix. FIG. 5c shows the results of the inactive hybrid membrane with the mesh matrix. FIG. 5d shows the results with an activated hybrid membrane with the sheet matrix, and FIG. 5e shows the results with an activated hybrid membrane with the mesh matrix. It can be seen that the slosh amplitude decreased dramatically with the use of an active hybrid membrane 10. It is seen that the mesh embodiments display better results in terms of damping due to the increased flexibility and the ability to absorb energy on a much better scale. The slightly stiffer sheet embodiment, though not as effective as the mesh, still displayed appreciable damping characteristics.

Figure 6A:
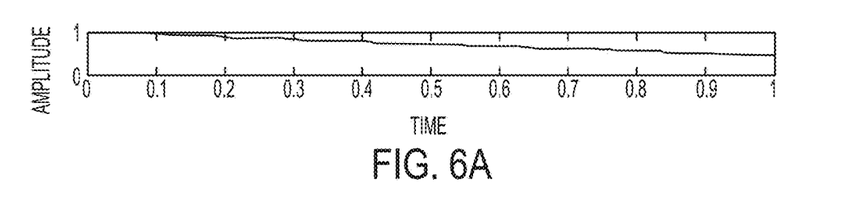
FIGS. 6a-e are normalized graphs of slosh for various test conditions at high amplitude.
Figure 6B:
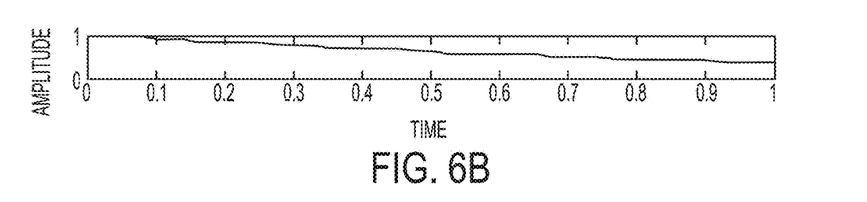
Figure 6C:
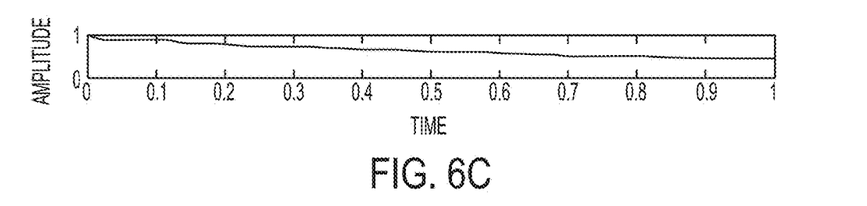
Figure 6D:
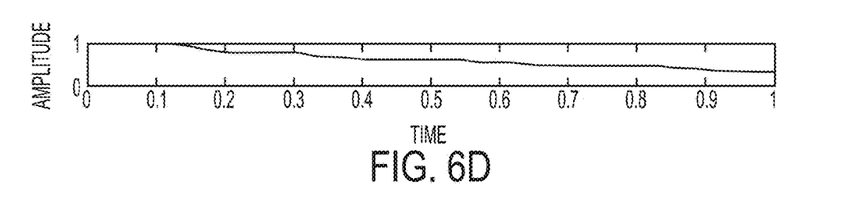
Figure 6E:
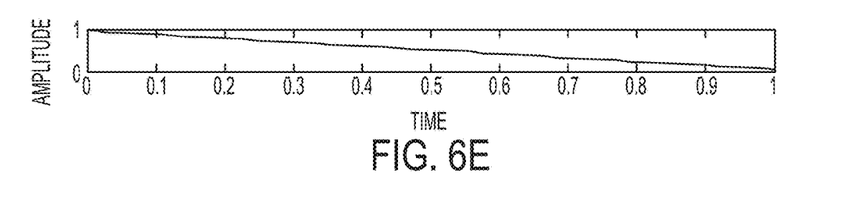

The same test was conducted for the high amplitude test case with the results shown in FIGS. 6a-e. FIG. 6a shows the case were no PMD is present in the tank 28. FIG. 6b shows the results of the inactive hybrid membrane with the sheet matrix. FIG. 6c shows the results of the inactive hybrid membrane with the mesh matrix. FIG. 6d shows the results with an activated hybrid membrane with the sheet matrix, and FIG. 6e shows the results with an activated hybrid membrane with the mesh matrix. As shown similar results in terms of damping characterization are obtained under the high amplitude test as under the low amplitude test. This supports both the repeatability of the results in various conditions as well as the effectiveness and efficiency of the magneto activated hybrid membrane 10.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

We claim:

1. A fuel tank management device for damping liquid fuel slosh within a fuel tank of a vehicle, comprising:
    a hybrid magneto-active membrane sized, dimensioned, and/or configured to be received within the fuel tank of the vehicle so as to absorb energy from sloshing of liquid fuel in the fuel tank, the hybrid magneto-active membrane comprising: at least one polymer membrane; and a magneto-active matrix comprising a layer of magnetically permeable material configured to move with the at least one polymer membrane; and
    a magnetic field source operable to generate a magnetic field of a sufficient strength to effect a change in shape or stiffness or configuration or combinations thereof of the hybrid magneto-active membrane for damping sloshing of the liquid fuel in the fuel tank in response to at least one of: a variation in slosh amplitude of the liquid fuel within the fuel tank, fuel fill levels, an attitude of the vehicle, an anticipated maneuver, or combinations thereof.

2. The fuel tank management device of claim 1, wherein the magnetic field source comprises an electromagnet and a power supply for providing varying power levels to vary the strength of the magnetic field.

3. The fuel tank management device of claim 2, wherein the strength of the magnetic field is varied in response to the variation in slosh amplitude of the liquid fuel within the fuel tank, fuel fill levels, the attitude of the vehicle, the anticipated maneuver, or combinations thereof.

4. The fuel tank management device of claim 2, wherein the magnetic field source is arranged to generate the magnetic field acting substantially parallel with the hybrid magneto-active membrane.

5. The fuel tank management device of claim 1, wherein the layer of magnetically permeable material comprises a mesh.

6. The fuel tank management device of claim 1, wherein the layer of magnetically permeable material comprises an iron-based magnetic alloy.

7. The fuel tank management device of claim 1, wherein the at least one polymer membrane is combined with, embedded with, or impregnated into the magneto-active matrix.

8. A magneto-active propellant management device (MAPMD) for a fuel tank, comprising:
    a hybrid membrane sized, dimensioned, and/or configured to be received within the fuel tank, and operable to absorb energy from liquid fuel sloshing in the fuel tank, the hybrid membrane comprising:
    at least one polymer membrane, and
    a magneto-active matrix comprising a layer of magnetically permeable material configured to move with the at least one polymer membrane, wherein the at least one polymer membrane is combined with, embedded with, or impregnated into the magneto-active matrix; and
    a magnet in proximity to the hybrid membrane, wherein the magnet is configured to generate a magnetic field for activating the magneto-active matrix and to vary one or more properties and/or a configuration of the hybrid membrane so as to substantially dampen fuel slosh of the liquid fuel within the fuel tank.

9. The MAPMD according to claim 8, wherein the layer of magnetically permeable material comprises a mesh.

10. The MAPMD according to claim 8, wherein the layer of magnetically permeable material comprises an iron-based magnetic alloy.

11. The MAPMD according to claim 8, wherein the magnet comprises a selectively energizable electromagnet configured to generate a variable magnetic field for effecting changes in stiffness, shape, configuration, or combinations thereof in the hybrid membrane for damping of free surface effect and fuel slosh at varying slosh amplitudes, fuel fill levels, an anticipated maneuver, or attitudes of the fuel tank.

12. The MAPMD according to claim 11, wherein the magnetic field is provided substantially parallel with the hybrid membrane.

13. A vehicle, comprising:
a fuel tank; and
the MAPMD according to claim 8, wherein the hybrid membrane is positioned within the fuel tank of the vehicle.

14. The vehicle of claim 13, wherein the hybrid membrane floats on a surface of the fuel within the fuel tank.

15. A method for damping fuel slosh within a fuel tank of a vehicle, comprising:
positioning a hybrid magneto-active membrane within the fuel tank, the hybrid magneto-active membrane comprising:
at least one polymer membrane, and
a magneto-active matrix comprising a flexible layer of magnetically permeable material configured to move with the at least one polymer membrane; and
in response to a variation in slosh amplitude of the liquid fuel within the fuel tank, fuel fill levels, an attitude of the vehicle, or an anticipated maneuver, or combinations thereof, generating a magnetic field proximate to the fuel tank to activate the magneto-active matrix to effect a change in shape or stiffness or both of the hybrid magneto-active membrane, sufficient to absorb energy from sloshing fuel within the fuel tank to substantially dampen sloshing movement of the fuel.

16. The method of claim 15, wherein generating the magnetic field comprises generating the magnetic field to act substantially parallel with the hybrid magneto-active membrane.

17. The method of claim 15, wherein generating the magnetic field comprises providing current to an electromagnet in anticipation of a stage separation maneuver.

* * * * *